(No Model.)
A. J. WRIGHT.
BRAKE MECHANISM FOR CARS.
No. 456,608. Patented July 28, 1891.
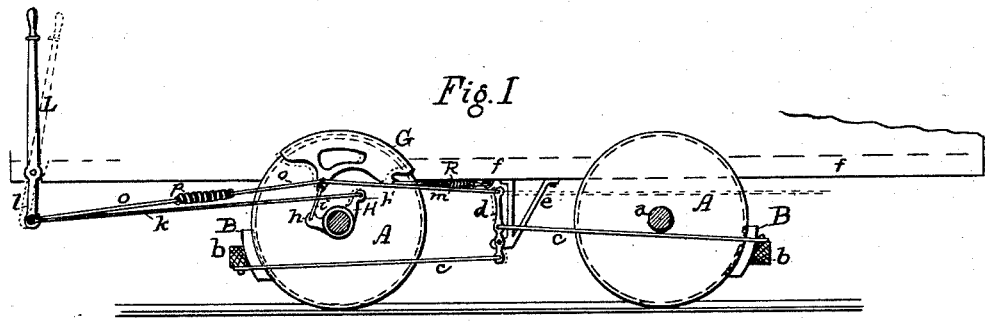
Fig. 1
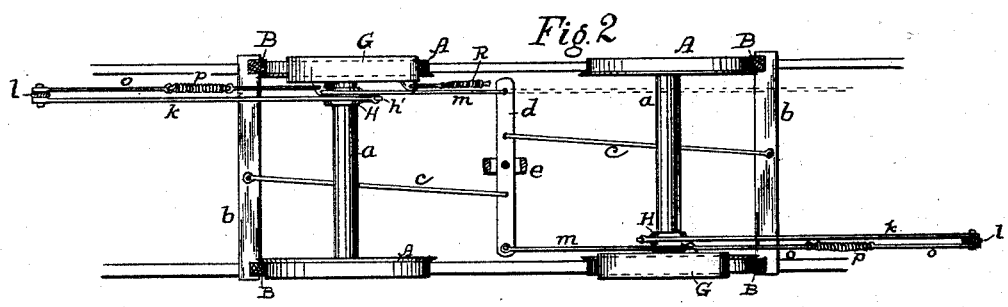
Fig. 2
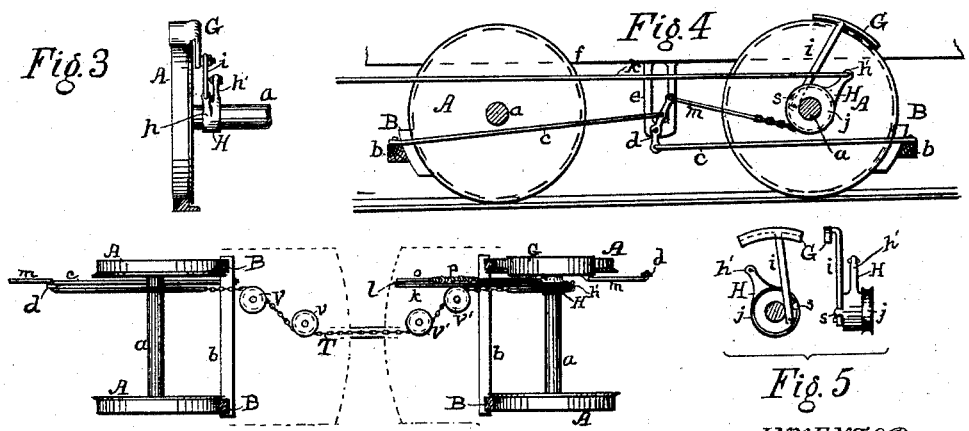
Fig. 3  Fig. 4  Fig. 5
Fig. 6
WITNESSES
L. R. Vorce
L. Prentiss
INVENTOR
Allen J. Wright
by C. M. Vorce
ATTORNEY

UNITED STATES PATENT OFFICE.

ALLEN J. WRIGHT, OF CLEVELAND, OHIO.

BRAKE MECHANISM FOR CARS.

SPECIFICATION forming part of Letters Patent No. 456,608, dated July 28, 1891.

Application filed November 3, 1890. Serial No. 370,257. (No model.)

*To all whom it may concern:*

Be it known that I, ALLEN J. WRIGHT, a citizen of the United States, residing at Cleveland, in the county of Cuyahoga and State of Ohio, have invented certain new and useful Improvements in Brake Mechanism for Cars; and I do hereby declare the following to be a full, clear, and exact description of the invention, such as will enable others skilled in the art to which it appertains to make and use the same.

My invention relates to improvements in brake mechanism for street-railway and other cars and to a novel method of connecting the brake mechanism of several cars one with another in such manner that the power employed in braking any car in a train shall be automatically transmitted to and become the operative force for adjusting the brakes on the following car; and the invention consists in the construction of parts and in the method of combination and arrangement of parts hereinafter described, and pointed out in the claims.

The object of the invention is to simplify and cheapen the construction, reduce the number of wearing parts, and secure greater efficiency of operation, and the features of invention by which this object is chiefly accomplished are, first, the applying of the friction-clamp by which the brake mechanism is operated to the periphery of the tread of the car-wheel, whereby a number of parts previously employed are dispensed with and increased efficiency is obtained; second, in the setting of the brakes into contact with and light bearing upon the wheels before the friction-clamp operates, whereby gradual grip of the brakes is secured and the shock usually experienced in the application of clutch-brakes is avoided, and, third, in the method of connecting the brake mechanism of several cars.

In the drawings, Figure 1 is a view in elevation of the running-gear and brake mechanism, the car-body and nearer wheels being broken away. Fig. 2 is a plan view of the same parts shown in Fig. 1, showing all the wheels. Fig. 3 is a view in elevation of the car-wheel and friction-shoe with its connections. Fig. 4 is a view in elevation of a modified form of construction of the device shown in Fig. 1. Fig. 5 is a detached view in elevation of the modified form of shoe, rocking lever, and drum shown in Fig. 4. Fig. 6 is a plan view of the construction adopted in connecting the brake mechanism of two cars, showing the rear axle of one car and the front axle of the one following.

I will first describe the brake mechanism as applied to each car, and, secondly, the method of connecting and operating the brakes in series on two or more cars.

A A represent the car-wheels; $a$ $a$, their axles; B B, the brake-shoes; $b$ $b$, the brake-beams; $c$ $c$, the brake-rods; $d$, the brake-lever or connecting-lever, and $e$ a bracket by which it is supported from the sill $f$ of the car-body, or in any convenient way. These parts do not differ in their construction and arrangement from those in common use in double-acting or compound brakes.

G is a friction-shoe adapted to fit upon the periphery of the tread of the car-wheel for about one-quarter of its circumference, more or less, according to the power required.

H is a rocking lever pivoted on the car-axle, although it may, if preferred, be supported on a pivot attached by a bracket or other means to the truck. To the forward end $h$ of the lever H the friction-shoe G is attached by one or more rods $i$, or equivalent means, in such manner that when the lever H is in its normal position, as hereinafter explained, the shoe G is supported a little above and out of contact with the wheel. To the rear end $h'$ of the lever H, which is preferably made longer and heavier than its forward end, is attached one end of a rod $k$, the other end of which is secured to the short arm $l$ of the hand-lever L, by which the brakes are set. A rod $m$ connects the rod $i$, or, if preferred, the arm $h$ of lever H or the shoe G itself to the lever $d$, as shown in Fig. 2. The rod $i$ or shoe G is also connected to the short arm $l$ of the lever L by the rods $o$ $o$, which are joined by a coil-spring $p$, for a purpose presently to be described.

R is a spring attached to the friction-shoe G and to the body or other rigid part of the car to draw back the various parts to their normal position when the brakes are released. This spring may, if preferred, be applied to the lever $d$ instead of to the shoe G, and perform the same office, and may be dispensed with when the gravity of the parts is sufficient to keep them out of contact with the wheels. In place of the rods *c c k m o*, chains or cords suitably supported may be used, or a part of the length of each rod may consist of links or joints to avoid too great rigidity of the parts. The connection of the various rods with the levers, &c., is so made as to allow the necessary play, as is usual in the construction of brake mechanism and connections.

The hand-lever L is placed at the forward end of the car in a position convenient for the operator, and where the car is intended to run with either end forward, as in most street-cars and motor-cars, one such lever L is placed at each end of the car, and the friction-shoe and connections, as above described, are duplicated for each axle and set of wheels, so as to enable the brakes to be set from either end of the car.

In their normal position, as while the car is running, the brakes are "off," and the parts are then in the position shown by full lines in Fig. 1, the action of the spring R and the gravity of the brake beams and shoes holding the latter out of contact with the wheels, and the upper arm of lever L being thrown forward, so as to stand vertical, or nearly so. When it is desired to apply the brakes, the upper end of the hand-lever L is drawn back, as shown by dotted lines in Fig. 1, and this, by means of the rods *o o* and *m* and the lever *d* with the rods *c c*, draws forward the friction-shoe G and draws up the brake-shoes B B into contact with the wheels, while at the same time, by the rod *k* and the rocking lever H and rod *i*, the friction-shoe G is drawn downward into contact with the tread of the wheel, and, binding upon the same by frictional contact, is carried forward and downward with the motion of the wheel, and thus, by drawing forward the rod *m* and lever *d*, tightens the brake-shoes B B upon the wheels, while itself acting as a brake-shoe to stop the rotation of the wheel to which it is applied. The spring *p* is made strong enough to overcome the spring R and the weight of the brake beams and shoes and enable them to be drawn up into contact with the wheels and lightly grip the same, but yields to the further movement of lever L, and thus enables the rod *k* to pull forward the upper or rear end of the rocking lever H and draw down the friction-shoe G into close contact with the wheel and hold it there. By thus setting up the brakes lightly before the positive-acting friction of the shoe G upon the wheel is effected I accomplish the gradual tightening of the brakes and avoid the jar and shock which is so noticeable and objectionable in the application of positive-acting clutch-brakes of the usual kind.

As a modification of the construction above described, I construct the rocking lever H in some cases of the form shown in Figs. 4 and 5, in which the hub of the lever H is prolonged into a sleeve, to one end of which the rod *i*, supporting the shoe G, is pivoted as a substitute for the short arm *h* of the usual form of the lever H, and the other end of the hub is formed into a drum *j*, upon which the cord or chain connected with or supplying the place of the rod *m* is wound to set the brakes. A stop *s*, projecting from the hub in advance of the point at which rod *i* is pivoted thereto, bears against the rod *i* as the shoe G is carried forward by the wheel, and thus revolves the hub and winds up the chain or cord, thus setting the brakes. Where preferred, the rod *i* may be connected to the hub or to arm *h'* by a chain or link, so as to produce an equivalent effect and dispense with stop *s*. This modified form of construction is preferably applied to cars designed to run always with the same end forward, and is applied, preferably, to the rear axle of the car, as shown in Fig. 4, in which figure the drum *j* is shown upon the rear axle, and the rod *k* leads forward past the front axle to the hand-lever L, (not shown in Fig. 4, but to be of the construction shown in Fig. 1,) or to the lever *d*, as shown in dotted lines on Fig. 1 and in Fig. 2.

It is obvious that the lever *d* may be placed either vertically, as shown in Figs. 1 and 4, or horizontally, as shown in Fig. 2, as the construction of the car and truck may render most convenient, and either arrangement is within my invention. Usually it is placed horizontally, but in motor cars or where the space between the axles is otherwise obstructed it is preferably placed in the vertical position, as the brake-shoes have very limited play and but little motion of the lever-arms is required. It is equally obvious that instead of the single friction-shoe G two or even more such shoes may be used, each connected, as shown and described, and the power thus greatly increased, and such construction is also within my invention; also, instead of the hand-lever L, the vertical shaft, with spool at bottom and crank or ratchet at top, which is in use in the common hand-brake on horse-cars, could be used by connecting a short piece of chain to the rod *k*; but the quicker-acting lever shown is much to be preferred. No ratchet for holding the lever L in position is shown, it being understood that this well-known feature is to be applied or omitted, as the judgment of the mechanic in any case may dictate. In the case of cable-grip cars or motor-cars drawing trail-cars it is desirable to be able to brake all the cars in the train from the motor or grip car, which will enable the gripman or motor-man to do the work, which otherwise would require a brakeman on each of the trail-cars, as the hand-brakes now in use do, and will enable the brakes to be more quickly applied in case of need. This operating of all the brakes from the motor or grip car I accomplish through the great power exercised by the friction-shoe by means of the following described devices: Each of the cars is provided with the previously-described brake-actuating mechanism and brakes. A chain or cord T is attached to the upper or outer end of the brake-lever d, as indicated by dotted lines in Figs. 1 and 2, and is carried around sheaves v v back to the center line of the car, and thence across to the following car in the central line and around sheaves v' v' on said car to a point in line with the rocking lever H, to the rearward arm h' of which it is attached. This arrangement is shown in Fig. 6, and it will be readily observed that when the brake-lever d on any car is drawn forward in applying the brakes it will draw on the chain T, and will thus pull forward the lever H on the following car, and thus actuate the shoe G on that car and cause it to set the brakes of that car, which in turn will in the same manner set the brakes of the succeeding car, and so on throughout the train, and as the power of each friction-shoe acts on the lever actuating that of the succeeding car the brakes on each car will be set with the combined power of their own friction-shoe and the pull of the car in front, and this will prevent the cars from jamming or butting each other, as they do when the brakes on the forward car act before those on the following car.

What I claim as my invention, and desire to secure by Letters Patent, is—

1. In car-brake mechanism, the combination, with the car-wheel, of a friction-shoe operatively connected with the car-brakes and adapted to engage the car-wheel, and means for causing said shoe to engage the car-wheel and operate the car-brakes, substantially as described.

2. In car-brake mechanism, the combination, with the car-wheel, of a friction-shoe adapted to engage the car-wheel and operatively connected with the brakes, mechanism supporting said shoe normally out of contact with the wheel, and means for causing said shoe to engage the car-wheel and operate the brakes, substantially as described.

3. In car-brake mechanism, the combination of the friction-shoe adapted to engage the car-wheel and operatively connected with the brakes, the rocking lever adapted to actuate said shoe and the car-brakes, and the hand-lever connected with said shoe and with the rocking lever, substantially as described.

4. In car-brake mechanism, the combination of the friction-shoe adapted to engage the car-wheel and having operative connection with the brakes, the rocking lever for actuating said shoe, and the hand-lever having yielding connection with the brakes and rigid connection with the rocking lever, substantially as described.

5. In car-brake mechanism, the combination of the friction-shoe adapted to engage the car-wheel and having operative connection with the brakes, a lever operatively connected with said shoe and with the hand-lever by which the brakes are set, and a connection between the operating hand-lever and the brakes, substantially as described.

6. In car-brake mechanism, the combination of a friction-shoe adapted to engage the car-wheel and rotate partially therewith, a connection between said shoe and the brakes, whereby the partial rotation of the shoe will set the brakes, a lever connected with said shoe to effect the engagement of the same with the wheel and with the operating hand-lever for applying the brakes, the hand-lever connected with the brakes and with the shoe-actuating lever, and a spring for maintaining the shoe out of engagement with the wheel, substantially as described.

7. In car-brake mechanism, the combination of a friction-shoe adapted to engage the car-wheel, a lever pivotally connected with said shoe for causing the same to engage the car-wheel, a drum actuated thereby and connected with the brakes for setting the same, and the hand-lever connected with said shoe-actuating lever, substantially as described.

8. In car-brake mechanism, the combination of the friction-shoe adapted to engage the car-wheel, the rocking lever connected therewith, the rigid connection between the shoe and the brakes, the yielding connection between the shoe and the hand-lever, the hand-lever with rigid connection to the rocking lever, the retracting-spring for releasing the brakes, and the car-wheels and brakes, all combined and operating substantially in the manner and for the purposes described.

9. In car-brake mechanism, the combination of friction-shoes on each car operatively connected with the brakes on the same car and with mechanism for causing such shoe to engage the car-wheel, and a connection between the brake-actuating lever of each car and the shoe-actuating mechanism of the next car, substantially as described.

10. The combination, in car-brakes, with the brake mechanism, substantially as described, on each car, of the sheaves connected to the car-body and a chain passing over or around said sheaves and connecting the brake-lever of each car with the brake-actuating mechanism of the following car, whereby the brake-actuating mechanism of each car is caused to automatically set the brakes of the following car, substantially as described.

In testimony whereof I hereto affix my signature in presence of two witnesses.

ALLEN J. WRIGHT.

Witnesses:
H. W. WARD,
S. PRENTISS